//

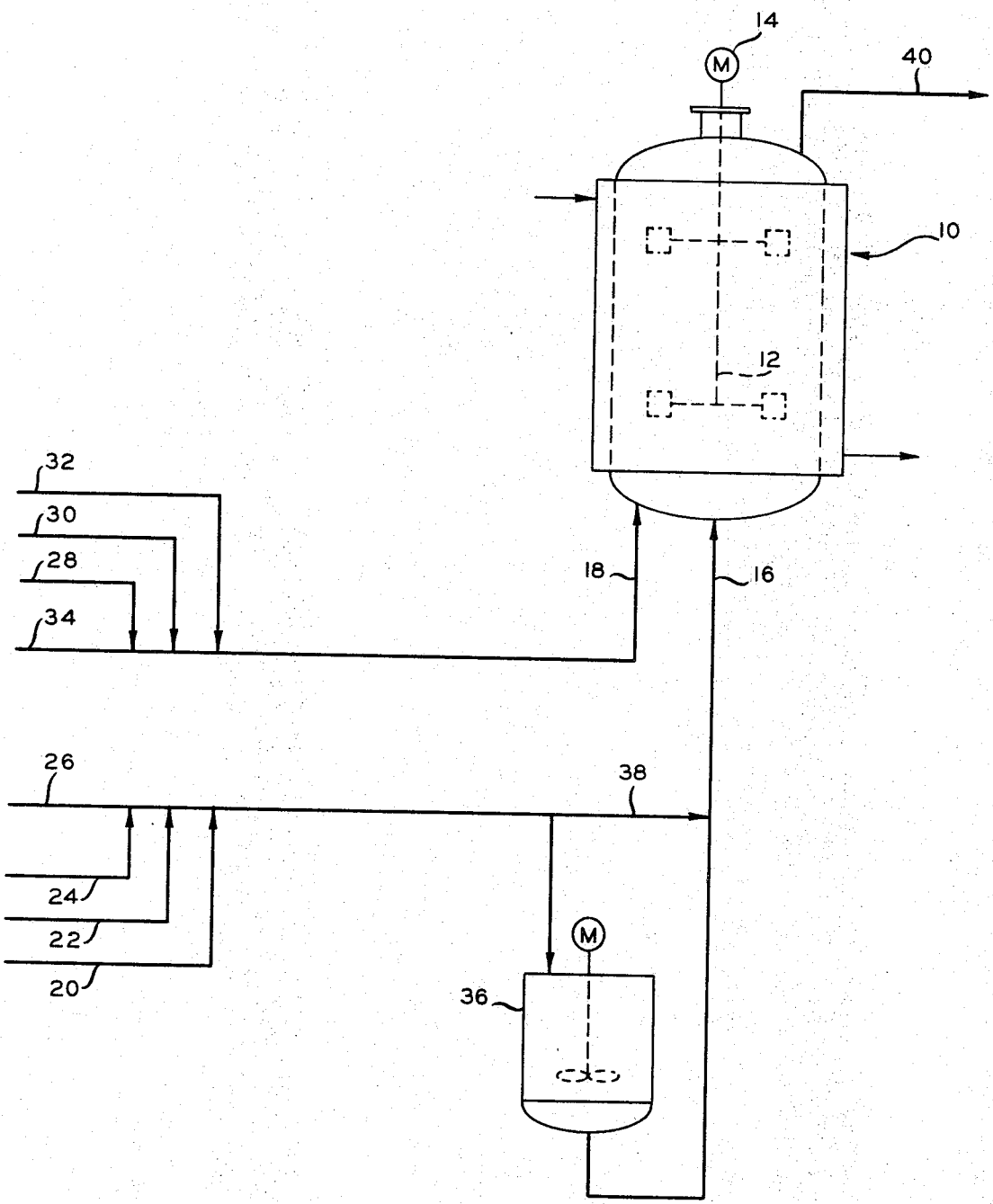

United States Patent Office 3,534,007
Patented Oct. 13, 1970

1

3,534,007
TERPOLYMER POLYMERIZATION
Alfred A. Hoffman, Jr., Pasadena, Tex., and Donald D. Norwood, Bartlesville, Okla., assignors to Phillips Petroleum Company, a corporation of Delaware
Filed Jan. 17, 1966, Ser. No. 520,935
Int. Cl. C08f *15/40*
U.S. Cl. 260—80.78                  2 Claims

ABSTRACT OF THE DISCLOSURE

Gel content in terpolymers is reduced by utilizing as a catalyst system in the polymerization reaction therefor a premixed catalyst system wherein the constituents of the catalyst are contacted for a period of 1 to 5 seconds in the absence of monomer prior to introduction into the polymerization zone. In addition ratio of monomer in the terpolymer is controlled by (a) varying the ratio of solvent to monomer and (b) controlling the reactor temperature.

---

This invention relates to a process for the copolymerization of ethylene and higher 1-monoolefins and a monomer which imparts unsaturation to the resulting polymer. In one aspect this invention relates to a method for forming a polymer having a low gel content. Another aspect relates to a method for controlling ratio of monomers in the terpolymer. Another aspect relates to a method for catalyst addition so as to obtain a polymer having a low gel content. A still further aspect relates to an improved polymerization system for forming copolymers wherein the polymer obtained has a low gel content.

1-monoolefins such as ethylene and propylene are very important polymer intermediate today because they are commercially available in great volume at very low cost. It is known that they can be copolymerized to give products ranging in form from low molecular weight oils to high molecular weight solids. However, such copolymers are not convenient to cure since, unlike natural rubber, GRS or butyl rubber, they contain essentially no ethylenic unsaturation which can be sulfur cured. To overcome this problem various dienes have been added to the copolymer since it is known that 1-olefin polymers containing hydrocarbon diene units can be sulfur cured. While the resulting products were found to be sulfur curable, the polymers did not necessarily exhibit optimum properties. Thus, for example, in the product formed by the copolymerization of ethylene, propylene and dicyclopentadiene the formation of gel in the system presents a problem since it not only increases the difficulty of processing the copolymer but also tends to plug the reactors and associated conduits as well as reduce the total productivity of desired copolymer which is obtained. It is therefore desirable to provide a system which would allow minimum gel formation.

Another problem in the formation of terpolymers is the control of the ratio of monomers incorporated into the final product. Since variations in the ratio of components in the terpolymer result in a variation of the properties of the terpolymer, it is apparent that there is a need to be able to control the make-up of same.

It is thus an object of this invention to provide an improved process for the copolymerizing of ethylene, at least one higher 1-monoolefin and a monomer which imparts unsaturation to the resulting polymer.

Another object of this invention is to provide an improved polymerization process wherein the gel content is substantially reduced.

Another object of this invention is to provide an improved polymerization system whereby there is controlled the ratio of monomers appearing in the product thereof.

Other aspects, objects and the several advantages of this invention are apparent from a study of the disclosure, the drawing and the appended claims.

We have discovered in accordance with this invention that in the copolymerization of ethylene with at least one higher 1-monoolefin and a monomer which adds unsaturation to the polymer that the gel content therein is significantly reduced by either controlling the temperature of the solvent introduced to the reactor or by premixing the catalyst constituents just prior to introduction of same into the reactor. Further, in accordance with this invention we have discovered that the ratio of components occurring in the final product can be regulated by (a) varying the ratio of solvent to monomer and (b) controlling the reactor temperature.

To illustrate the present invention reference is made to the accompanying figure, which is a diagrammatic view of the polymerization process.

A polymerization reactor 10 having stirring means 12 actuated by motor 14 is adapted to be charged simultaneously with feed conduits 16 and 18 respectively. Conduits 20, 22 and 24 are in association with conduit 16 and serve to introduce solvent and catalyst components to the reactor 10. Conduit 26, having suitable control means therein, serves to introduce, if desired, hydrogen to the reactor. Conduits 28, 30 and 32 are in operable association with conduit 18 and serve to introduce solvent, monomer and scavenging catalyst to the reactor. Conduit 34 is provided to introduce hydrogen, if desired, to the reaction system. Premix 36 is provided downstream of the make-up point for the various ingredients to be introduced to reactor 10 by conduit 16 and serves to assure complete mixing of the components prior to introduction to the reactor. By-pass line 38 is provided to allow direct flow of the feed components to the reactor if desired.

The reactor is illustrated having a catalyst preform zone 36 in association therewith for premixing of catalyst components prior to introduction to the reactor. If desired, one catalyst component may be introduced via conduit 18 and the other via conduit 16 whereby in situ formation of the catalyst is achieved. Conduit 40 serves to remove polymer from the reactor 10.

By using the above-described reactor system in the manner as is it will be further described in conjunction with the specific examples, the various objects of the present invention are achieved.

The 1-monoolefins which are copolymerized with ethylene or with ethylene and termonomers such as dicyclopentadiene, according to this invention, can be represented by the general formula $CH_2\!=\!CHR$, where R is an alkyl radical having 1 to 6 carbon atoms. Representative 1-monoolefins coming within the scope of this general formula and useful in this invention include propylene, 1-butene, 1-pentene, 1-hexene, 1-octene, 3-methyl- 1-butene, 3-methyl-1-pentene, 3-methyl-1-hexene, 4-ethyl-1-hexene, 4,4-dimethyl-1-pentene, 3,3-dimethyl-1-butene, 5-methyl-1-hexene, 4-methyl-1-heptene, 5-methyl-1-heptene, 4,4 - dimethyl-1-hexene, 6-methyl-1-heptene, 3,4,4-trimethyl-1-pentene, and the like, including mixtures of two, three or more thereof.

The termonomers which can be copolymerized with ethylene and any one of the above-mentioned 1-monoolefins, according to this invention, include any of those known in the art, particularly those which import ethylenic unsaturation to the polymer and enable the same to be vulcanized with sulfur. Representative termonomers are discyclopentadiene (3a,4,7,7a-tetrahydro-4,7-methanoindene), acyclic non-conjugated dienes such as 1,4-pentadiene, 1,5-hexadiene, 2-methyl-1,5-hexadiene, 3,3-dimethyl-1,5-hexadiene, 1,7-octadiene, 1,9-decadiene, 6-methyl-1,5-heptadiene, 11-ethyl-1,11-triadecadiene, and the like; acetylenes such as acetylene, vinylacetylene, isopropylacetylene, and the like; and norbornenes such as 5-methylene-2-norbornene, and the like.

The relative percentages of the polymers prepared by the improved process of this invention which are attributable to each of the monomers employed can vary widely. Generally, the ethylene and higher 1-monoolefin comonomers will each make up from 25 to 75 weight percent of the polymer, and where a termonomer, such as dicyclopentadiene, is employed, it will generally make up from 0.5 to 20 weight percent of the polymer. Of course, the nature of the polymer, that is its molecular weight, inherent viscosity, tensile strength, etc., will be dependent upon the monomeric materials charged and their relative ratios and the reaction conditions, and those skilled in the art of polymerization will be readily able by means of simple routine tests to determine what conditions are optimum for any particular polymer product desired.

Any of the polymerization coordination catalysts known in the prior art can be employed in the polymerization process of this invention, such catalysts comprising (1) at least one compound of a reducible polyvalent transition metal of Groups IV–B, V–B, VI–B, VII–B, VIII of the Periodic Table (e.g., titanium, vanadium, chromium, manganese, iron, cobalt, and nickel), said reducible compound being a halide, oxyhalide, alcoholate acetylacetonate, or acetate, and (2) at least one reducing compound of a metal of Groups I, II, III–A, IV–A, and V–A of the Periodic Table (e.g., lithium, sodium, potassium, rubidium, cesium, beryllium, magnesium, calcium, strontium, barium, copper, zinc, cadmium, mercury, aluminum, tin, and antimony), which is preferably above hydrogen in the electromative series, said reducing compound being an organometal compound, a metal hydride, an organometal hydride or an organometal halogen compound. (The Periodic Table referred to herein and in the claims is shown on page B-2 of the Handbook of Chemistry & Physics, 45th ed., published by Chemical Rubber Publishing Co., Cleveland, Ohio.) Preferably, the metal of the reducible compound is vanadium, titanium or chromium, with vanadium trichloride, vanadium tetrachloride, vanadium oxytrichloride, vanadium oxydichloride, vanadiuma cetylacetonate, vanadyl acetylacetonate, titanium tetrachloride, tetrabutyl titanate, tetraisopropyl titanate, chromic chloride, chromium acetylacetonate, and chromyl acetylacetonate being examples of preferred reducible components of the coordination catalyst. Preferably, the reducing compound has the general formula $R_nMX_m$ where R is a saturated aliphatic, cycloaliphatic, or aromatic hydrocarbon radical having from 1 to 20 carbon atoms, M is a metal selected from the group consisting of lithium, sodium, potassium, magnesium, calcium, zinc, mercury, aluminum, and tin, X is a halogen selected from the group consisting of chlorine, bromine, and iodine, n is a number from 1 to 4, m is a number from 0 to 2, and $n+m$ is equal to the valence of metal M. The mole ratio of the reducing compound to the reducible compound in the catalyst system can vary widely, and generally this ratio will be in the range of 1:1 to 20:1. The total catalyst level in the reaction system can also vary widely, and generally will be 0.001 to 10 percent by weight of the toal monomers, or as expressed in terms of the amount of reducible compound, the catalyst level can be in the range of 0.25 to 40 millimoles (mmoles) per 100 grams of the total monoolefin charged to the reaction system.

Representative reducible transition metal compounds which can be used in making up the coordination catalysts used in preparing the polymers of this invention include: titanium tetrachloride, titanium tetrabromide, titanium oxydichloride, tetraisopropyl titanate, titanium trichloride, tetra-n-butyl titanate, tetra-2-ethylbutyl titanate, vanadium trichloride, vanadium tetrachloride, vanadium oxytrichloride, vanadium acetylacetonate, vanadyl acetylacetonate, tetra-n-butyl vanadate, tetraethyl vanadate, trimethyl orthovanadate, vanadium oxydichloride, vanadium dichloride, 2-ethylhexyl vanadate, vanadium dibromide, vanadium pentoxide, chromyl chloride, chromium acetylacetonate, chromyl acetylacetonate, chromium chloride, cobaltous chloride, manganese bromide, cuprous chloride, ferric bromide, molybdenum chloride, nickel chloride, and the like, including mixtures thereof.

Representative reducing compounds which can be commingled with any one of the above-named transition metal compounds to prepare the coordination catalyst used in this invention include: ethylaluminum sesquichloride, ethylaluminum sesquiiodide, n-butylaluminum sesquibromide, isopropylaluminum sesquichloride, n-hexylaluminum sesquichloride, n-decylaluminum sesquiiodide, trihexylaluminum, triethylaluminum, diethylaluminum chloride, ethylaluminumdichloride, dissobutylaluminum butoxide, triisobutylaluminum, aluminum hydride, isobutylaluminum dichloride, isobutylaluminum dibtoxide, n-butylaluminum dichloride, n-butyllithium, sodium naphthalene, diisobutylzinc, lithium aluminum tetra-n-decyl, lithium aluminum tetra-n-octyl, amylpotassium, tetraphenyltin, diethyltin diiodide, n-butylmagnesium bromide, diphenylcalcium, di-tert-butylzinc, diethylmercury, and the like, including mixtures thereof.

Representative of the coordination catalysts which can be used in this invention are those obtained upon commingling vanadium tetrachloride and ethylaluminum sesquichloride, vanadium trichloride and ethylaluminum sesquibromide, vanadium oxytrichloride and n-butylaluminum sesquibromide, vanadium oxydichloride and isopropylaluminum sesquichloride, vanadium acetylacetonate and n-hexylaluminum sesquichloride, vanadium oxydichloride and diisobutylaluminum butoxide, vanadium oxytrichloride and triisobutylaluminum, vanadium oxytrichloride and aluminum hydride, vanadium dichloride and triisobutylaluminum, vanadium trichloride and isobutylaluminum dichloride, vanadium tetrachloride and isobutylaluminum dibutoxide, vanadium tetrachloride and triisobutylaluminum, vanadium tetrachloride and aluminum hydride, 2-ethylhexyl vanadate and triisobutylaluminum, titanyl dichloride and isobutylaluminum dichloride, titanium tetrachloride and isobutylaluminum dichloride, titanium tetrachloride and lithium aluminum didodecyldichloride, titanium tetrachloride and n-decylaluminum sesquiiodide, titaniumtetrachloride and sodium naphthalene, tetraisopropyl titanate and triisobutylaluminum, tetraisopropyl titanate and sodium naphthalene, cobaltous chloride and triisobutylaluminum, cobalt bromide or chloride and triisobutylaluminum, manganese bromide and triisobutylaluminum, manganese bromide and diisobutylzinc, chromium chloride and triisobutylaluminum, chromium acetylacetonate and n-heptylaluminum sesquichloride, cuprous chloride and triisobutylaluminum, ferric bromide and triisobutylaluminum, molybendum chloride and triisobutylaluminum, nickel chloride and triisobutylaluminum, vanadium oxytrichloride and diethylaluminum chloride, vanadium tetrachloride and ethylaluminum dichloride, vanadium oxydiacetylacetonate and triethylaluminum, trimethyl orthovanadate and trihexylaluminum, vanadium tetrachloride and trihexylaluminum, vanadium oxytrichloride and butyllithium, vanadium triacetylacetonate and diethylaluminum chloride, titaninum tetrachloride and trihexylaluminum, vanadium trichloride and trihexylaluminum, titanium trichloride and trihexylaluminum, titanium dichloride and trihexylaluminum, vanadium trichloride and n-butyllithium, vanadium tetrachloride and amylpotassium, vanadium oxytrichloride and sodium naphthalene, vanadium oxydichloride and diethylmagnesium, vanadium acetylacetonate and butylmagnesium bromide, vanadyl acetylacetonate and diphenylcalcium, chromic chloride and di-tert-butylzinc, chrominum acetylacetonate and diethylmercury, chromyl acetylacetonate and tetraphenyltin, titanium tetrachloride and diethyltin diiodide, tetra-n-butyl titanate and diethylmagnesium and the like.

The polymerization reaction of this invention is carried out in the liquid phase system using a solvent, or a mixture of solvents in which the catalyst and polymer product are soluble. As such the system can be described as a solution polymerization system. The solvent is charged to the reactor in each of two feed streams, and the concentration of the monomeric materials in the feed streams can vary and will be dependent upon the particular polymer product desired. Usually, the feed stream containing ethylene will contain from 1 to 15 weight percent of the ethylene in the solvent, and the feed stream containing the higher 1-monoolefin will contain the latter in a concentration of about 1 to 30 weight percent in the solvent. Where a termonomer is used, it will be present generally in the feed stream in the amount of about 0.02 to 10 weight percent in the solvent. Solvents which can be employed include any of those known in the prior art, and these solvents will usually be a hydrocarbon or halogenated hydrocarbon, such as propane, butane, hexane, benzene, toluene, xylene, tetrachloroethylene, cyclohexane, methylcyclohexane chlorobenzene, o-dichloromethane, 1,1,2,2-tetrachloro ethane, and the like. The polymer, as mentioned above, will be soluble in the solvent and usually will be present in a concentration of 1 to 15 weight percent.

The polymerization reaction of this invention is carried out in the absence of those materials which have a deleterious effect on the catalyst activity, such as oxygen, carbon dioxide, and water. The polymerization conditions can vary widely, but generally the polymerization temperatur will be in the range of −80 to 150° C. The reaction pressure, maintained by pumping solvent under pressure into a liquid-full reactor, will be that sufficient to maintain the reaction mixture in the liquid phase and can be up to 500 or more atmospheres.

Following polymerization, the polymer product can be conventionally recovered from the effluent by coagulation with a non-solvent such as an alcohol like isopropyl alcohol or n-butyl alcohol, acetone, or the polymer can be recovered by stripping the solvent with heat or steam. An antioxidant can be incorporated in the polymer during the recovery procedure, such as phenyl-beta-naphthylamine, di-tert-butylhydroquinone, triphenylphosphite, heptylated diphenylamine, 2,2′-methylene-bis(4-methyl-6-tert-butylphenol), and 2,2,4-trimethyl-6-phenyl-1,2-dihydroquinoline.

Vulcanization or curing of the polymers prepared by this invention can be carried out with conventional vulcanization procedures. Where sulfur is employed in the vulcanization of the polymers, the amount of sulfur used will generally be about 0.1 to 5 parts per 100 parts of polymer (phr.) and generally about 0.5 to 3 phr. The vulcanization can be effected, for example, at temperatures of 250 to 400° F. for 5 to 120 minutes. Peroxides, for example 0.1 to 10 phr., can be used for vulcanization, representative peroxides being bis(alpha, alpha-dimethylbenzyl) peroxide, diisopropyl peroxide, di-tert-butyl peroxide, dibenzoyl peroxide, alpha, alpha-dimethylbenzyl hydroperoxide, tert-butyl perbenzoate, etc. Vulcanization accelerators, accelerator activators, reinforcing agents, extenders, plasticizers, antioxidants and fillers, like those agents used in compounding natural and synthetic rubber, can also be employed. Fillers and reinforcing agents such as carbon black, clay, calcium silicate, talc, silica, whiting, and titanium dioxide, and plasticizers such as naphthenic and paraffinic oils, acn be used in compounding the polymers of this invention. Such polymers will have molecular weights in the range of about 5000 to 1,000,000, and can be used in fabricating such rubber goods and plastic products as coatings for electrical cables, windowseals, garden hose, soles and heels, belts, coated fabrics, tires, films, coatings, containers (bottles), pipes, fibers, etc.

The objects and advantages of this invention are illustrated in the following examples, but it should be understood that the various materials used in these examples, the conditions of operation, and other details, should not be construed to unduly limit this invention.

EXAMPLE I

In a 10-gallon capacity jacketed stainless steel vessel operated with flow up through the agitated vessel at a pressure of 120–125 p.s.i.g. were introduced 24 parts by weight polymerization grade ethylene and 72 parts propylene and 4 parts commercial grade dicyclopentadiene in 1900 parts polymerization grade cyclohexane and a catalyst system composed of a dilute solution of triethylaluminum sesquichloride and vanadium oxytrichloride in cyclohexane. The solvent-monomer ratio was 19:1.

The catalyst components $VOCl_3$ and EASC were line mixed externally to the reactor. A premix time of 1 to 5 seconds was employed.

The polymerization reaction is exothermic and heat evolved was removed by precooling the feed streams and by indirect heat exchange through the reactor walls. A constant 120° F. reaction temperature was maintained as well as a constant hydrogen addition of 0.00331 p.h.m.

The reactor was agitated by two turbine type impellers mounted on a single shaft turning at about 350 r.p.m. Residence time in the reactor was 30 minutes.

The following data illustrates results obtained from the above system.

TABLE I

Reaction temperature, 120° F.
Average Mooney viscosity, 72.
Observed total conversion, percent, 34.4.
Observed gel formed, 0.

| Component | Parts by weight | Composition of polymer, weight, percent | Observed monomer conversion, percent |
|---|---|---|---|
| Cyclo $C_6$ | 1,900 | $C_3$ | Propylene, 15. |
| $C_3$ | 72 | DCPD | DCPD, 52. |
| $C_2$ | 24 |  | Ethylene, 89. |
| DCPD | 4 |  |  |
| EASC | 0.48 |  |  |
| $VOCl_3$ | 0.11 |  |  |
| $H_2$ | 0.0033 |  |  |

A second run was carried out as above except the catalyst was formed in situ by withholding the mixing of the components until after introduction to the poiymerization zone.

In situ formation of the catalyst gave the following results:

lower catalyst usage
    higher conversion
    higher productivity
    lighter polymer color
    higher gel By premixing catalyst components for a period of 1–5 seconds there are obtained the advantages of in situ formation with the added advantage of essentially no gel formation in the reactor.

EXAMPLE II

By adiabatic operation of the ethylene, propylene, dicyclopentadiene system of Example I and thus removing the heat evolved from the polymerization reaction by decreasing the temperature of the feed stream responsive to a sensed and desired temperature in the reactor so as to thereby provide sufficient temperature differential between the actual temperature desired and the feed, the reactor can be operated with wall temperature about the same as the reaction temperature and gel formation on the walls of the reactor is substantially reduced.

The reactor is maintained at a temperature of 120 to 140° F. Sufficient cooling is achieved through the heat exchange of the feed stock so as to maintain this temperature. After 112 hours of operation there was no gel in the bottom of the reactor and only a very thin film on the internal surface of the reactor as compared to about ¼ inch gel coating on the internal surface of the reactor and the whole bottom full of gel when operating with cold wall temperature.

EXAMPLE III

Ethylene-propylene-dicyclopentadiene terpolymer was produced using EASC and $VOCl_3$ catalyst system in a manner as described in Example I. The ratio of solvent to monomers in the reactor was reduced which thereby resulted in the increase in the propylene incorporated into the polymer.

The following results were obtained:

TABLE II.—EPDM RUBBER POLYMERIZATION DATA SUMMARY FOR SOLVENT TO MONOMER RATIO VARIATIONS

| | Solvent/Monomer Weight Ratio | | | | | |
|---|---|---|---|---|---|---|
| | 4/1 | 4/1 | 6/1 | 9/1 | 14/1 | 19/1 |
| | Time Period Hours, Mo./Day/1964 | | | | | |
| | 1200–1300, 11/6 | 1800–2000, 11/6 | 0300–1000, 11/3 | 0000–1000, 11/12 | 1700–2000, 11/12; and 0000–0200, 11/13 | 0700–1300, 11/13 |
| Weight recipe: | | | | | | |
| Cyclohexane | 400 | 400 | 600 | 900 | 1,400 | 1,900 |
| Propylene | 72 | 72 | 72 | 72 | 72 | 72 |
| Ethylene | 24 | 24 | 24 | 24 | 24 | 24 |
| DCPD | 4 | 4 | 4 | 4 | 4 | 4 |
| EASC | 0.77 | 0.71 | 0.64 | 0.64 | 0.48 | 0.48 |
| $VOCL_3$ | 0.30 | 0.275 | 0.25 | 0.20 | 0.135 | 0.11 |
| Hydrogen | 0.0033 | 0.0033 | 0.0033 | 0.0033 | 0.0033 | 0.0033 |
| Reaction temperature, °F | 126 | 129 | 120 | 120 | 120 | 120 |
| Avg. Mooney viscosity ML–4 | 59 | 75 | 68 | 73 | 67 | 72 |
| Composition of polymer wt. percent: | | | | | | |
| Propylene | 46.95 | 42.70 | 45.55 | 39.09 | 35.74 | 31.73 |
| DCPD | 6.34 | 5.96 | 6.08 | 5.65 | 6.16 | 5.99 |
| Ethylene | 46.71 | 51.34 | 48.37 | 55.26 | 58.10 | 62.28 |
| $C_2/C_3$ wt. ratio | 50/50 | 55/45 | 51/49 | 59/41 | 62/38 | 66/34 |
| Observed total conversion, percent | 59.9 | 53.9 | 53.9 | 47.7 | 35.7 | 34.4 |
| Corrected total conversion, percent | 48.9 | 44.5 | 47.2 | 41.2 | | |
| Observed monomer conversion, percent: | | | | | | |
| Propylene | 39 | 32 | 34 | 27 | 18 | 15 |
| DCPD | 95 | 80 | 82 | 67 | 55 | 52 |
| Ethylene | 116 | 116 | 109 | 110 | 86 | 89 |
| Corrected monomer conversion, percent: | | | | | | |
| Propylene | 32 | 26 | 30 | 22 | | |
| DCPD | 78 | 66 | 72 | 58 | | |
| Ethylene | 95 | 95 | 95 | 95 | | |

The above data clearly indicate that by decreasing solvent to monomer ratio from 19:1 to 4:1 the propylene content of the terpolymer is increased from 31–47 percent.

EXAMPLE IV

Ethylene-propylene-dicyclopentadiene having controlled propylene incorporation was carried out in the manner as set forth in Example I. The reactor temperature was varied over a range of 40–140° F.

The following results were obtained:

TABLE III

| Average reactor temperature, °F. | Conversion | Mooney, ML–4 | Weight percent $C_3$ in R |
|---|---|---|---|
| 40 | 47.0 | 73 | 48.65 |
| 80 | 39.6 | 67 | 39.90 |
| 120 | 38.8 | 75 | 37.18 |

The data demonstrate that the percent of propylene incorporated into the polymer can be regulated responsive to reactor temperature.

EXAMPLE V

Polymers were prepared in a continuous polymerization system as described in Example I using the following recipes and conditions:

TABLE IV

| | Parts by weight | | | |
|---|---|---|---|---|
| | Batch Number | | | |
| | 1 | 2 | 3 | 4 |
| Ethylene | 32 | 26 | 24 | 24 |
| Propylene | 64 | 70 | 72 | 72 |
| Dicyclopentadiene | 4 | 4 | 4 | 4 |
| Cyclohexane | 1,900 | 1,900 | 1,900 | 1,900 |
| $VOCl_3$ | 0.06 | 0.028–0.056 | 0.12 | 0.20 |
| $EtAlCl_2.Et_2AlCl$ | 0.325 | 0.16–0.32 | 0.428 | 0.497 |
| $H_2$ | 0.0061 | 0.0122 | 0.0061 | 0.0037–0.0056 |
| Temperature, °F | 80 | 80 | 40 | 80 |
| Pressure, p.s.i.g | 150 | 150 | 150 | 150 |
| Reaction time, min | 30 | 30 | 30 | 30 |
| Conversion, percent | 60 | 38 | 47 | 45 |

Each batch of polymer was shortstopped by the addition of 2 parts by weight per 100 parts of monomers of a mixture of $C_{16}$–$C_{18}$ saturated and unsaturated fatty acids, steam stripped, extruder dried, and stabilized by the addition of 1 part by weight per 100 parts of rubber of 2,6-di-tert-butyl-4-methylphenol. An equal weight of each batch was used to prepare the blend used in the process of my invention.

EXAMPLE VI

The polymer blend obtained from Example V was mixed in a Banbury mixer at 118 r.p.m. for 0.5 minute and a finely-divided crumb was obtained. A portion of the finely-divided crumb was mixed an additional minute with 25 parts by weight of carbon black, 2.5 parts of zinc oxide and 0.5 part of stearic acid per 100 parts of polymer blend. A fine free-flowing black powder was obtained.

Another portion of the finely-divided crumb of Example V is mixed an additional minute with 25 parts by weight of silica, 2.5 parts of zinc oxide, and 0.5 part of stearic acid per 100 parts of polymer blend. A fine free-flowing white powder is obtained.

The above examples demonstrate that a fine crumb can be obtained having a high thermal stability and high ozone resistance is obtained by Banbury mixing the terpolymer of ethylene, propylene and dicyclopentadiene.

While only a single reactor has been illustrated in both the drawing and the various examples, it will be apparent to those skilled in the art that a series of reactors can be used in carrying out the polymerization of this invention. In addition, other variations and modifications of the systems as illustrated can be achieved without departing from the inventive concept thereof. For example, when two or more reactors are used in series, interstage addition of ethylene and vanadium oxychloride can be made to each of the reactors in series. Similarly, the reactor conditions for each of the reactors in the series can be varied. The polymers produced according to the present invention can also have the physical properties of same modified by the use of additional hydrogen in the reaction system.

The inherent viscosities referred to in the examples were determined by placing one tenth gram of polymer in a wire cage made from 80 mesh screen and placing the wire cage in 100 ml. of toluene contained in a widemouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The amount of toluene insolubles referred to in the examples is that amount of material not dissolved after 0.2 gram sample of the polymer remains in contact with 100 milliliters of toluene at room temperature for 24 hours. The value should be below 50 weight percent for a rubbery polymer. Ordinarily, it is preferred to have the value below 25 weight percent, but for some uses (mechanical goods, mats, shoe soles, etc.) it can be higher. For uses where high resilience and low heat buildup are important, it is desirable to have the toluene insolubles low.

Various modifications and alterations of this invention will become apparent without departing from the scope and spirit of this invention and it should be understood that this invention is not to be limited unduly to that set forth herein for illustrative purposes.

We claim:

1. In a process for the solution polymerization of a terpolymer consisting of ethylene, propylene and dicyclopentadiene wherein said ethylene, propylene and dicyclopentadiene are polymerized in a polymerization zone maintained under polymerization conditions and in the presence of a cyclohexane solvent and a polymerization catalyst formed by the admixing of vanadium oxytrichloride and triethylaluminum sesquichloride, wherein the mol ratio of said ethylaluminum compound to said vanadium oxytrichloride compound is in the range of from 1:1 to 20:1 and wherein the total catalyst level is within the range of 0.001 to 10 percent by weight of the total monomers, and wherein said catalyst components are premixed for a period of 1 to 5 seconds prior to introduction into the polymerization zone, said premixing being carried out in the absence of said ethylene, propylene and dicyclopentadiene, the improvement which comprises controlling the amount of propylene in the resulting terpolymer by regulating the solvent-to-monomer ratio in the range of 19:1 to 4:1 whereby decrease in solvent-to-monomer ratio provides an increase in the propylene content and conversely an increase in said solvent-to-monomer ratio provides a decrease in the propylene content of the resulting ethylene-propylene-dicyclopentadiene terpolymer.

2. In a process for the solution polymerization of a terpolymer consisting of ethylene, propylene and dicyclopentadiene wherein said ethylene, propylene and dicyclopentadiene are polymerized in a polymerization zone maintained under polymerization conditions and in the presence of a cyclohexane solvent and a polymerization catalyst formed by the admixing of vanadium oxytrichloride and triethylaluminum sesquichloride, wherein the mol ratio of said ethylaluminum compound to said vanadium oxytrichloride compound is in the range of from 1:1 to 20:1 and wherein the total catalyst level is within the range of 0.001 to 10 percent by weight of the total monomers, and wherein said catalyst components are premixed for a period of 1 to 5 seconds prior to introduction into the polymerization zone, said premixing being carried out in the absence of said ethylene, propylene and dicyclopentadiene, the improvement which comprises carrying out the polymerization at a temperature in the range of 40 to 120° F. wherein the amount of propylene is regulated in the resulting ethylene, propylene, dicyclopentadiene, terpolymer by varying the reaction temperature whereby an increase in reaction temperature results in a decrease of propylene in said terpolymer and conversely a decrease in reaction temperature results in an increase of propylene in the resulting terpolymer.

References Cited

UNITED STATES PATENTS

| 3,205,216 | 9/1965 | McManimie | 260—94.9 |
| 3,341,503 | 9/1967 | Paige | 260—80.78 |
| 3,250,753 | 5/1966 | Kottenhahn | 260—80.6 |
| 3,317,496 | 5/1967 | Natta | 260—88.2 |

OTHER REFERENCES

NATTA et al.: Ethylene-Propylene Copolymerization in the Presence of Catalysts Prepared From Vanadium Triacetylacetonate, Journal of Polymer Science, vol. 51, 1961, pp. 411–426.

JOSEPH L. SCHOFER, Primary Examiner

R. S. BENJAMIN, Assistant Examiner